US012106743B1

(12) United States Patent
Shapiro

(10) Patent No.: US 12,106,743 B1
(45) Date of Patent: Oct. 1, 2024

(54) BEAT PLAYER MUSICAL INSTRUMENT

(71) Applicant: Chord Board, LLC, Old Bethpage, NY (US)

(72) Inventor: Akiva Shapiro, Old Bethpage, NY (US)

(73) Assignee: Chord Board, LLC, Old Bethpage, NY (US)

( * ) Notice: Subject to any disclaimer, the term of this patent is extended or adjusted under 35 U.S.C. 154(b) by 0 days.

(21) Appl. No.: 18/512,627

(22) Filed: Nov. 17, 2023

(51) Int. Cl.
*G10H 1/34* (2006.01)
*G10H 1/00* (2006.01)
*G10H 1/40* (2006.01)

(52) U.S. Cl.
CPC ............. *G10H 1/34* (2013.01); *G10H 1/0016* (2013.01); *G10H 1/0066* (2013.01); *G10H 1/40* (2013.01); *G10H 2210/361* (2013.01); *G10H 2210/381* (2013.01); *G10H 2230/281* (2013.01); *G10H 2230/365* (2013.01)

(58) Field of Classification Search
CPC ...... G10H 1/34; G10H 1/0016; G10H 1/0066; G10H 1/40; G10H 2210/361; G10H 2210/381; G10H 2230/281; G10H 2230/365
See application file for complete search history.

(56) References Cited

U.S. PATENT DOCUMENTS 4,926,738 A 5/1990 Kondo
5,434,350 A 7/1995 Haney et al.
5,457,282 A * 10/1995 Miyamoto ............... G10H 1/36 84/634
5,521,327 A 5/1996 Kay et al.
5,841,052 A 11/1998 Stanton
5,856,628 A 1/1999 Noguchi et al.
6,177,624 B1 1/2001 Takahashi et al.
7,309,829 B1 12/2007 Ludwig
9,286,875 B1 3/2016 Kerr
10,496,250 B2 12/2019 Herberger et al.
2002/0005108 A1 1/2002 Ludwig
2004/0200338 A1 10/2004 Pangrle
2008/0215599 A1 9/2008 Yun
2010/0064880 A1 3/2010 Takehisa et al.
2011/0132181 A1 6/2011 Kockovic
2012/0024132 A1* 2/2012 Wallace ................. G10H 1/183 84/689
2012/0174735 A1 7/2012 Little et al.
2012/0247308 A1 10/2012 Tsai
2012/0297961 A1 11/2012 Shim
2013/0118338 A1 5/2013 Wallace et al.
2013/0151556 A1* 6/2013 Watanabe ............. G06F 16/632 707/769
2013/0239787 A1 9/2013 Mcmillen et al.
(Continued)

*Primary Examiner* — Jianchun Qin
(74) *Attorney, Agent, or Firm* — Greenblum & Bernstein, P.L.C.

(57) ABSTRACT

A musical instrument operable to play a multi-component percussive beat. The musical instrument includes a plurality of finger controllers, wherein each finger controller is operable to control a component part of the multi-component percussive beat. Each of the plurality of finger controllers has a touch-sensitive range providing a plurality of actuation regions, and each actuation region is operable to play a hit pattern associated with a component percussion track representing a respective component of the multi-component percussive beat.

29 Claims, 13 Drawing Sheets

(56) References Cited

U.S. PATENT DOCUMENTS

| | | | |
|---|---|---|---|
| 2014/0137719 A1 | 5/2014 | Wagstaff-Walker | |
| 2014/0260916 A1 | 9/2014 | Oppel | |
| 2017/0213535 A1 | 7/2017 | Wernick et al. | |
| 2017/0249930 A1 | 8/2017 | Takehisa | |
| 2019/0012995 A1 | 1/2019 | Lupini et al. | |
| 2020/0012344 A1 | 1/2020 | McMillen et al. | |
| 2020/0111461 A1 | 4/2020 | Dron | |
| 2021/0151015 A1 | 5/2021 | Recchia | |
| 2021/0151016 A1 | 5/2021 | Recchia | |
| 2021/0166667 A1 | 6/2021 | Gill et al. | |
| 2022/0208160 A1* | 6/2022 | Marticorena | ........ G10H 1/0008 |
| 2023/0114371 A1 | 4/2023 | Lopez Duarte | |
| 2023/0178059 A1 | 6/2023 | Schulze | |

* cited by examiner

700

<u>percussive beat library</u>

(n) Percussive beats
- hit patterns
- tempo

750

<u>drum kit library</u>

(m) drum kits
- default sounds
- selectable alternative sounds

FIG. 7

BEAT PLAYER MUSICAL INSTRUMENT

BACKGROUND OF THE DISCLOSURE

1. Field of the Disclosure

The present disclosure relates to a musical instrument, and more specifically relates to a hand-controlled rhythm-generating musical percussion player instrument, which may be physically embodied or virtually embodied on a touch screen, and method of use.

2. Background of the Disclosure

Research has established that studying music enhances academic achievement including areas of mathematics, science, geography, history, foreign language, physical education, and vocational training. For example, studies have shown that students with piano or keyboard experience performed 34% higher on tests that measure spatial-temporal lobe activity, which is the part of the brain that is used when doing mathematics, science, and engineering.

Studies have shown that music education can be used to enhance cognitive achievement in students. When a student is singing a melody with text, they are using multiple areas of their brain to multitask. Music positively impacts language development, increases IQ (Intelligence Quotient), spatial-temporal skills, and improves test scores. For example, music education has also been noted to have the ability to increase someone's overall IQ, especially in children during peak development years. Spatial ability, verbal memory, reading and mathematical ability are seen to be increased alongside music education (primarily through the learning of an instrument). Researchers also note that a correlation between general attendance and IQ increases is evident, and due to students' involvement in music education, general attendance rates increase along with their IQ. Fine motor skills, social behaviors, and emotional well-being can also be increased through music and music education. The learning of an instrument increases fine motor skills in students with physical disabilities. Emotional well-being can be increased as students find meaning in songs and connect them to their everyday life. Through social interactions of playing in groups like jazz and concert bands, students learn to socialize, and this can be linked to emotional and mental well-being.

Thus, the benefits of incorporating music, and specifically music making, on a person's well-being is well established. While these benefits of music making are clear, there are still many individuals who never learn or attempt to learn how to make music. For example, learning to play a new musical instrument, such a drum set, can be an intimidating and imposing task. With drums, for example, it can usually take many months of daily practice to progress enough to actually produce musical rhythms (e.g., in real-time). In other words, with a musical instrument, it usually takes significant time for a user to learn how to play the instrument in order to actually make music.

At the heart of most music worldwide is the percussive beat. In Western music, the percussive beat provides the backbone of the song and keeps time for the song. The percussive beat is traditionally sounded through a drum set (or drum kit) made up of various percussive and tonal component parts, wherein the drummer physically hits the component parts with the drumsticks in a rhythmic fashion, called herein called "hit patterns."

The fundamental component parts of the western drum set include, for example: (1) the kick drum; (2) the snare drum; (3) the ride cymbal; (4) the crash cymbal: (5) the high-hat cymbals (which open and close); and (5) the tom drum(s). There may be more than one of each of the foregoing component parts. More advanced western drum sets may include additional percussive component drum parts, such as, for example: a shaker, a clapper, a wooden block, multiple tom drums, and more. More advanced western drum sets may also include tonal component drum parts as well, such as the chimes or triangle, for example.

A percussive beat may be thought of as being comprised of a combined group of hit patterns. Each hit pattern corresponds to a single component part (percussive or tonal). The percussive beat repeats for parts (or the whole) of a song. For example, the simple form of the traditional "four on the floor" percussive beat may include three component part hit patterns. The first hit pattern may consist of one hit on the kick drum ($1^{st}$ component) for each quarter note in a measure, repeated for each measure in a song or part of a song with a time signature of 4/4. The second hit pattern may consist of one hit on the snare drum ($2^{nd}$ component) on the second and fourth beat of a measure, repeated and played alongside the kick drum. The third hit pattern may consist of one hit on the ride cymbal ($3^{rd}$ component) on every sixteenth note of the measure, repeated and played along with the kick and snare drums. When played together, the three hit patterns for the three respective component parts make up an example of a "four on the floor" percussive beat.

An advantage of a drummer playing a western drum set is the drummer has complete flexibility in playing a percussive beat on the component parts available. A disadvantage, however, is that playing a western drum set requires a high degree of aptitude and well-developed skills, which generally take years of education and practice to become proficient.

As technology evolved, the electronic drum set was invented, which substitutes electronic pads for the component parts. Each hit on an electronic pad translates into an electronic signal, which is processed by circuitry and triggers a sampled or synthesized sound corresponding to its respective component part (e.g., kick drum; snare drum; tom drum(s); ride cymbal; crash cymbal: high-hat cymbals) sampled or synthesized sound may be designed to sound like the component parts or may vary to any degree.

Tabletop electronic drum sets were also introduced, which allowed a drummer to play with drumsticks on the electronic pads. Finger drum sets were also introduced, which are a type of tabletop electronic drum set that allows the pads to be played with fingers. The layout of the electronic pads on a finger drum set were often small square pads placed in a four-by-four grid. The skill to play finger drum sets is called "finger drumming," and players are called "finger drummers." Finger drum sets may also be implemented on a touch screen.

As with the western drum set, a finger drummer playing on a finger drum set has complete flexibility in playing a percussive beat on the electronic pads available. An advantage a finger drummer playing a finger drum set has over a drummer playing a western "full size" drum set is that less aptitude and skill are required to become proficient with finger drums. A disadvantage is that playing a finger drum set still requires a strong aptitude and developed skill, which can take many months or years of education and practice.

Thus, both drummers and finger drummers must develop dexterity and timing skills to be able to manually play hit patterns on each component part or electronic pad, coordinated in real-time to a particular tempo. These skills require both aptitude and fortitude to learn, practice, and hone, in order to gain even basic proficiency to play in real-time to a particular tempo. These obstacles prevent most people from starting or sticking with drumming or finger drummer sufficiently long enough to become proficient.

The step sequencer is a music technology that is used for all aspects of music, including developing percussive beats. The step sequencer is comprised of multiple tracks. Each track holds a single hit pattern corresponding to a single component part (percussive or tonal). The combination of the tracks comprises the percussive beat. Each track is divided into a fixed number of steps corresponding to timing breakdown in a time signature. For example, there may be 16 steps in a track, each step representing a sixteenth note in a 4/4 time signature. A user programs the steps in each track of the sequencer one track at a time by pressing a button that will turn the step on or off.

Using the "Four on the Floor" example with a sixteen step breakdown per measure, to program the sequence, the user may select the kick drum track and program a hit at steps 1, 5, 9, and 11, representing beats 1, 2, 3, and 4. The user may then select the snare drum track and program a hit at steps 5 and 11, representing beats 2 and 4. Finally, the user may then select the ride cymbal track and program a hit at all of the sixteen steps. Once the percussive beat has been programmed in the sequencer, the percussive beat can then be played back one or multiple tracks at a time, each quantized to the others.

An advantage of the step sequencer is that it offers great flexibility and creative expression in experimenting with and creating percussive beats. Once a percussive beat is programmed and saved, it can be used repeatedly. Programming variations are relatively easy to make when not in real-time. The step sequencer also offers advantages over western drum sets and electronic drum sets, including: (1) less physical aptitude is necessary, overall; (2) there is virtually no dexterity requirement when not in real-time; and (3) the skill to use can be developed in much less time. For example, becoming proficient in programming a step sequencer may only take a few weeks or a few months.

A disadvantage of the step sequencer, however, is that there is minimal flexibility in varying the percussive beat in real-time. In real-time, the best use is playing back pre-programmed sequences, referred to as the "record and playback" method. While hit patterns can be varied, with the step sequencer, variations must be done one step at a time. In a unique use, varying the percussive beat one-step-at-a-time may be a featured part of a real-time performance, but otherwise, the speed of one-step-at-a-time variation cannot keep pace with the tempo of a typical song. Another disadvantage of the step sequencer is that some amount of technological aptitude is still necessary to become proficient. Programming also requires the ability to visualize (in the mind's eye) how various hit patterns applied to various component parts come together in different styles. Thus, becoming proficient at the step sequencer, while not as physically difficult as drumming and finger drumming, is nevertheless challenging. Most people find undertaking the task of becoming proficient at the step sequencer daunting. While the step sequencer significantly broadens percussive beat creation to a wider population relatively speaking, overall accessibility to percussive beat creation still only comprises a small percentage of the potential percussion playing population.

Yet another overall disadvantage of all the foregoing tools, approaches, and methods of western drum sets, electronic drum sets, and step sequencer methods is the necessity to learn the various different hit patterns for many percussive beats. To gain broad knowledge for real-time performance in a variety of songs, knowledge of hundreds (or even thousands) of timing and percussive variations are required to proficiently play a variety of styles and the many possibilities within each style.

By way of example, generally recognized styles include, for example, traditional rock, soft rock, punk rock, heavy metal rock, southern rock, traditional jazz, fusion jazz, pop, hip-hop, EDM, Latin, soul, house, country, funk, world, and ballroom. Within each style, there are numerous variations of percussive beats, each comprised of numerous variations of hit patterns. Each of the percussive beats requires a certain amount of understanding of music theory, such as the concept of time signatures, measures and the breakdown of measures. Each of the percussive beats also requires the aptitude to visualize (in the mind's eye) how hit patterns are synchronized when playing western drum or electronic drum sets, or how they are translated to the step sequencer.

Similar to a step sequencer, another method that evolved with technology is programming percussive beats using the MIDI (Musical Instrument Digital Interface) visual programming language on a computer. Using MIDI programming, a user can create hit patterns one hit at a time in a software program on a computer or smart device. Similar to the step sequencer, MIDI programming allows a user to program complex percussive beats one hit at a time for playback. MIDI programming has an advantage over the step sequencer in that MIDI programming allows greater flexibility of hit placement within a measure than a step sequencer.

MIDI programming, however, has nearly all the same disadvantages as the step sequencer. Additionally, MIDI programming, although visual, is not a skill that is intuitively understood by most people, and it requires a significant amount of education, training, and computer skills to become proficient. Unlike basic real-time modification that is possible with step sequencers, percussive beats developed using MIDI programming cannot easily, if at all, be modified in real-time.

At the other end of the spectrum, the record and playback method allows recording a completed percussive beat (created through any of the foregoing methods) and playing it back in real-time. This may be as an accompanying percussive backing track, for instance. Record and playback has the advantage of allowing playback of pre-recorded, professional sounding percussive beats by anyone in real-time without having any knowledge whatsoever of music theory or how to compose percussive beats. An additional advantage of the record and playback method is that the record and playback method requires no special dexterity or timing skills to hit the play button.

A disadvantage with the record and playback method, however, is that while the user can switch to different percussive beats at different stages of a real-time performance, the pre-recorded percussive beat and its constituent hit patterns generally play and stop as a whole without any significant real-time variation possible.

Due to such impediments as noted above with conventional percussion beat playing approaches, many people never attempt to play a percussion musical instrument. Other people may begin to learn to play a percussion musical instrument, but give up their endeavor before achieving sufficient proficiency with the instrument. As such, many people never experience or maintain the benefits of music making on their well-being.

Consequently, there is a gap in the current state of the art. Thus, there is a need for a musical instrument with an intuitive interface for music creation that does not pose impediments to immediate musical satisfaction. More specifically, what is needed is a device that allows anyone great flexibility and freedom of expression in playing a percussive beat in real-time, allowing for hit patterns to be easily varied during a real-time performance, without the need for any aptitude, dexterity, or timing skills, without the need for any knowledge of music theory or how to compose percussive beats, and without the need for any significant education, training, or technology or computer skills. There is a need for a musical instrument with an intuitive interface for music creation that doesn't require a significant investment in time and energy to learn in order to play sophisticated percussive beats in real-time simply and easily, in order to provide new creative avenues for beginner and experienced musicians alike.

SUMMARY OF THE EMBODIMENTS OF THE DISCLOSURE

Aspects of the disclosure are directed to a musical instrument that allows anyone great flexibility and freedom of expression in playing a percussive beat in real-time, allowing for hit patterns to be easily varied during a real-time performance, without the need for any aptitude, dexterity, or timing skills, without the need for any knowledge of music theory or how to compose percussive beats, and without the need for any significant education, training, or technology or computer skills. Embodiments of the present disclosure are directed to a musical instrument with an intuitive interface for music creation that doesn't require a significant investment in time and energy to learn in order to play sophisticated percussive beats in real-time simply and easily, in order to provide new creative avenues for beginner and experienced musicians alike.

Aspects of the disclosure are directed to a musical instrument operable to play a multi-component percussive beat, the musical instrument comprises a plurality of finger controllers, wherein each finger controller is operable to control a component part of the multi-component percussive beat, each of the plurality of finger controllers having a touch-sensitive range providing a plurality of actuation regions, and each actuation region is operable to play a hit pattern associated with a component percussion track representing a respective component of the multi-component percussive beat.

In embodiments, the component parts include at least two of: a kick drum; a snare drum; a tom drum; a ride cymbal; a crash cymbal; and a high-hat.

In additional embodiments, the plurality of finger controllers are arrayed in a hand-shaped layout.

In further embodiments, the plurality of actuation regions on each of the plurality of finger controllers is a same number of actuation regions for each of the plurality of finger controllers.

In yet additional embodiments, the plurality of actuation regions on each of the plurality of finger controllers is a different number of actuation regions for at least some of the plurality of finger controllers.

In embodiments, the plurality of actuation regions on each of the plurality of finger controllers is five actuation regions.

In additional embodiments, each of the finger controllers comprises a MIDI polyphonic expression (MPE) controller.

In further embodiments, the musical instrument further comprises a tempo selector operable to select a tempo of the multi-component percussive rhythm.

In yet additional embodiments, the musical instrument further comprises a tempo display operable to display the selected tempo of the multi-component percussive rhythm.

In embodiments, the musical instrument further comprises a percussive beat selector operable to select a percussive beat of the multi-component percussive rhythm.

In additional embodiments, the musical instrument further comprises a percussive beat display operable to display the selected percussive beat of the multi-component percussive rhythm.

In further embodiments, the musical instrument further comprises a drum kit selector operable to select a drum kit of the multi-component percussive rhythm.

In yet additional embodiments, the musical instrument further comprises a drum kit display operable to display the selected drum kit of the multi-component percussive rhythm.

In embodiments, the musical instrument further comprises a sound selector operable to select a sound of the selected drum kit.

In additional embodiments, the musical instrument further comprises a sound display operable to display the selected sound of the multi-component percussive rhythm.

In further embodiments, the musical instrument further comprises a hit pattern selector operable to select a hit pattern of the multi-component percussive beat.

In yet additional embodiments, the musical instrument further comprises a hit pattern display operable to display the selected hit pattern of the multi-component percussive beat.

In embodiments, a first finger controller is configured to control a high-hat component part of the multi-component percussive beat; a second finger controller is configured to control the snare drum component part of the multi-component percussive beat; a third finger controller is configured to control the kick drum component part of the multi-component percussive beat; a fourth finger controller is configured to control the rack toms component part of the multi-component percussive beat; a fifth finger controller is configured to control the floor tom component part of the multi-component percussive beat; a sixth finger controller is configured to control the crash cymbal component part of the multi-component percussive beat; and a seventh finger controller is configured to control the ride cymbal component part of the multi-component percussive beat.

In additional embodiments, with a single hand, a user can selectively activate each component part of the multi-component percussive beat.

In further embodiments, when a user actuates a hit pattern of the respective component part of the multi-component percussive beat by placing a finger down anywhere along the range of the actuation regions of a respective finger controller, the musical instrument is operable to playback a hit pattern based on the user selection.

In yet additional embodiments, one or more varied hit patterns are user-actuatable by moving their finger along the range of the finger controller to actuate one or more different actuation regions of the finger controller, and the musical instrument is operable to playback the one or more varied hit patterns based on the user selection.

In embodiments, the one or more varied hit patterns vary in rhythm complexity.

In additional embodiments, the one or more varied hit patterns vary in intensity.

In further embodiments, the musical instrument further comprises one or more palm controllers operable to trigger a variety of variations of the multi-component percussive rhythm.

In yet additional embodiments, at least one of the plurality of finger controllers is operable to trigger at least one of: percussion fills; random or quantized additional percussive or tonal sounds; sound effects; and/or audio processing effects.

In embodiments, each finger controller provides the user access to five different selectable hit patterns.

In additional embodiments, the musical instrument further comprises a component part indicator for each finger controller.

In further embodiments, the component part indicator is operable to display a component part indicator indicating the respective component part assigned to each finger controller.

In yet additional embodiments, a correspondence between each of the finger controllers and each of the component parts is user-configurable.

Implementing aspects of the disclosure provides a musical instrument with an intuitive interface for music creation that does not pose impediments (e.g., extensive knowledge and/or physical dexterity) to immediate musical satisfaction. For example, in contrast to learning to play a drum set (or kit) or a finger drum set, where it can usually take many months of daily practice to progress enough to actually produce hit patterns in real-time, with embodiments of the present disclosure, a musical instrument is provided in which neither extensive knowledge of hit patterns, nor dexterity are necessary to achieve immediate musical satisfaction. In other words, with the embodiments of the musical instrument of the present disclosure, it does not take significant time for a user to learn how to play the instrument in order to actually make percussion music. Additionally, implementing aspects of the disclosure provides a musical instrument with an intuitive interface for music creation that doesn't require a significant investment in time and energy to learn in order to play sophisticated percussive beats in real-time simply and easily, thus providing new creative avenues for beginner and experienced musicians alike.

Embodiments of the present disclosure provide a musical instrument that allows anyone great flexibility and freedom of expression in playing a percussive beat in real-time, allowing for hit patterns to be easily varied during a real-time performance, without the need for any aptitude, dexterity, or timing skills, without the need for any knowledge of music theory or how to compose percussive beats, and without the need for any significant education, training, or technology or computer skills.

As such, by implementing aspects of the disclosure, many more people may more readily access and experience playing music, and thereby experience the resulting benefits of music making on their well-being.

BRIEF DESCRIPTION OF THE DRAWINGS

The novel features which are characteristic of the musical instrument, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings, in which:

FIG. 7 depicts an exemplary hit pattern hierarchy and an exemplary drum kit hierarchy in accordance with aspects of the disclosure;

DETAILED DESCRIPTION OF THE EMBODIMENTS OF THE DISCLOSURE

Figure 1:
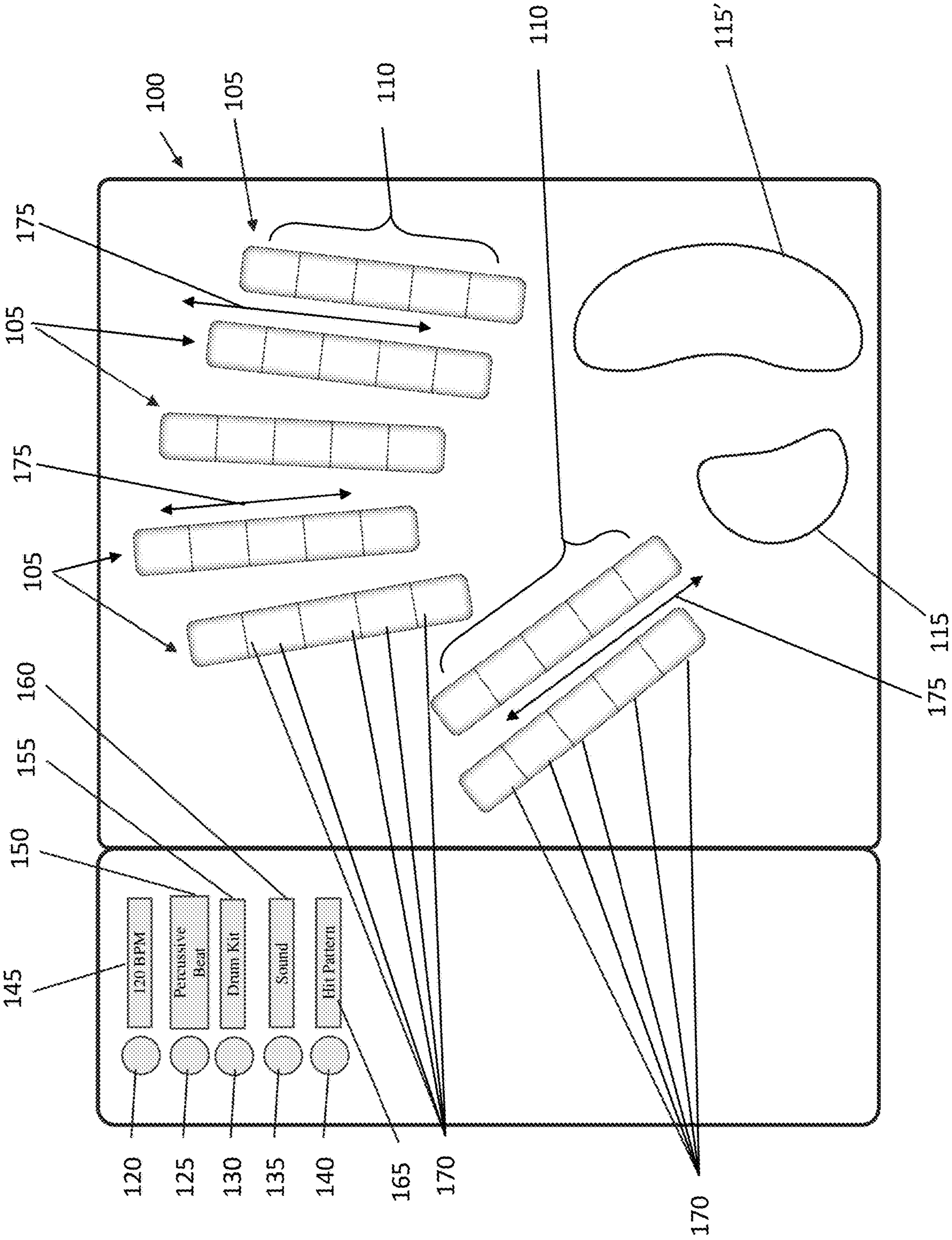
FIG. 1 shows an exemplary depiction of a percussion beat player (or beat player) in accordance with aspects of the disclosure.

The novel features which are characteristic of the disclosure, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the embodiments of the present disclosure. In this regard, no attempt is made to show structural details of the embodiments of the present disclosure in more detail than is necessary for the fundamental understanding of the embodiments of the present disclosure. The description, taken with the drawings, makes apparent to those skilled in the art how the forms of the embodiments of the present disclosure may be embodied in practice.

As used herein, the singular forms “a,” “an,” and “the” include the plural reference unless the context clearly dictates otherwise. As used herein, the indefinite article “a” indicates one as well as more than one and does not necessarily limit its referent noun to the singular.

Except where otherwise indicated, all numbers expressing quantities used in the specification and claims are to be understood as being modified in all examples by the term “about.” Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms “about” and “approximately” indicate that the amount or value in question may be the specific value designated or some other value in its neighborhood. Generally, the terms “about” and “approximately” denoting a certain value is intended to denote a range within ±5% of the value. As one example, the phrase “about 100” denotes a range of 100±5, i.e., the range from 95 to 105. Generally, when the terms “about” and “approximately” are used, it can be expected that similar results or effects according to the disclosure can be obtained within a range of +5% of the indicated value.

As used herein, the term “and/or” indicates that either all or only one of the elements of said group may be present. For example, “A and/or B” shall mean “only A, or only B, or both A and B”. In the case of “only A”, the term also covers the possibility that B is absent, i.e. “only A, but not B”.

The term “substantially parallel” refers to deviating less than 20° from parallel alignment and the term “substantially perpendicular” refers to deviating less than 20° from perpendicular alignment. The term “parallel” refers to deviating less than 5° from mathematically exact parallel alignment. Similarly, “perpendicular” refers to deviating less than 5° from mathematically exact perpendicular alignment.

The term “at least partially” is intended to denote that the following property is fulfilled to a certain extent or completely.

The terms “substantially” and “essentially” are used to denote that the following feature, property or parameter is either completely (entirely) realized or satisfied or to a major degree that does not adversely affect the intended result.

The term “comprising” as used herein is intended to be non-exclusive and open-ended. Thus, for example a composition comprising a compound A may include other compounds besides A. However, the term “comprising” also covers the more restrictive meanings of “consisting essentially of” and “consisting of”, so that for example “a composition comprising a compound A” may also (essentially) consist of the compound A.

The various embodiments disclosed herein can be used separately and in various combinations unless specifically stated to the contrary.

MIDI (/'midi/; Musical Instrument Digital Interface) is a technical standard that describes a communications protocol, digital interface, and electrical connectors that connect a wide variety of electronic musical instruments, computers, and related audio devices for playing, editing, and recording music. The specification originates in the paper Universal Synthesizer Interface published by Dave Smith and Chet Wood of Sequential Circuits at the 1981 Audio Engineering Society conference in New York City. A single MIDI cable can carry up to sixteen channels of MIDI data, each of which can be routed to a separate device. Each interaction with a key, button, knob or slider is converted into a MIDI event, which specifies musical instructions, such as a note’s pitch, timing and loudness. One common MIDI application is to play a MIDI keyboard or other controller and use it to trigger a digital sound module (which contains synthesized musical sounds) to generate sounds, which the audience hears produced by an amplifier (e.g., a keyboard amplifier). MIDI data can be transferred via MIDI or USB cable, or recorded to a sequencer or digital audio workstation to be edited or played back.

A MIDI controller is any hardware or software that generates and transmits Musical Instrument Digital Interface (MIDI) data to MIDI-enabled devices, typically to trigger sounds and control parameters of an electronic music performance. They most often use a musical keyboard to send data about the pitch of notes to play, although a MIDI controller may trigger other effects. Such a device provides a musical keyboard and perhaps other actuators (pitch bend and modulation wheels, for example) but produces no sound on its own. It is intended only to drive other MIDI devices. Electronic musical instruments, including synthesizers, samplers, drum machines, and electronic drums, are used to perform music in real-time and are able to transmit a MIDI data stream of the performance. Some are keyboard-only controllers, though many include other real-time controllers such as sliders, knobs, and wheels. Commonly, there are also connections for sustain and expression pedals.

A MIDI keyboard or controller keyboard is typically a piano-style electronic musical keyboard, often with other buttons, wheels and sliders, used for sending MIDI signals or commands over a USB or MIDI five-pin cable to other musical devices or computers. MIDI keyboards lacking an onboard sound module cannot produce sounds themselves, however some models of MIDI keyboards contain both a MIDI controller and sound module, allowing them to operate independently. When used as a MIDI controller, MIDI information on keys or buttons the performer has pressed is sent to a receiving device capable of creating sound through modeling synthesis, sample playback, or an analog hardware instrument. The receiving device could be:

- a computer running a digital audio workstation (DAW) or a standalone VST/AU software instrument (the receiving device can also be used to re-route the MIDI signal to other devices);
- a sound module; or
- a digital or analog hardware instrument with MIDI capability, such as a synthesizer or electronic piano or drum machine.

A typical signal path for a MIDI controller may include, for example:

MIDI controller→five-pin MIDI connector or USB cable→computer running a DAW or a standalone VST/AU software instrument or a sound module or an electronic piano, stage piano, or synthesizer with MIDI capability→audio sound device (amplifier and speakers or headphones).

Control surfaces are hardware devices that provide a variety of controls that transmit real-time controller messages transmitted over MIDI or a proprietary format. These enable software instruments to be programmed without the discomfort of excessive mouse movements, or adjustment of hardware devices without the need to step through layered menus, for example. Buttons, sliders, and knobs are the most common controllers provided, but rotary encoders, transport controls, joysticks, ribbon controllers, vector touchpads, and optical controllers may also be utilized. Controllers may be general-purpose devices that are designed to work with a variety of equipment, or they may be designed to work with a specific piece of software.

Sequencers store and retrieve MIDI data and send the data to MIDI-enabled instruments in order to reproduce a performance.

Software synthesizers offer great power and versatility, but some players feel that division of attention between a MIDI keyboard and a computer keyboard and mouse robs some of the immediacy from the playing experience. In contrast, devices dedicated to real-time MIDI control provide an ergonomic benefit and can provide a greater sense of connection with the instrument than can an interface that is accessed through a mouse and computer keyboard.

Aspects of the disclosure are directed to a musical instrument, comprising a percussive beat player (or beat player), which plays a percussive beat comprised of pre-programmed tracks dedicated to each component part for a target drum set, and which allows for playback and variation of the constituent hit patterns in real-time by use of an intuitive hand-controlled user interface. In embodiments, the hand-controlled user interface may be a physical user interface. In other embodiments, the hand-controlled user interface may be a touch screen user interface.

FIG. 1 shows an exemplary depiction of a percussion beat player (or Beat Board) 100, which is a music controller, and is musical instrument in accordance with aspects of the disclosure. With this exemplary and non-limiting embodiment, the beat player (or Beat Board) 100 includes a hand-shaped controller. As shown in FIG. 1, the beat player 100 includes a plurality of finger controllers 105. In accordance with aspects of the disclosure, the finger controllers 105 are arrayed generally in a hand-shaped pattern so that a user may overlay their hand (e.g., their right hand with the depicted embodiment) and use their fingers to contact the finger controllers 105. As such, in accordance with aspects of the disclosure, with a single hand a user can activate each component part of a drum kit and play drums with their single hand. While the exemplary embodiments depict a right-handed configuration, the beat player may be configured with a left-handed configuration (e.g., in a mirror image layout).

In accordance with additional aspects of the disclosure, each finger controller 105 corresponds to a component part (e.g., kick drum; snare drum; tom drum(s); ride cymbal; crash cymbal: high-hat cymbals), and provides access to tracks representing that component part. As shown in FIG. 1, each finger controller 105 includes a touch-sensitive range 110 providing a plurality of actuation regions 170 (e.g., five actuation regions) accessible along the range 110 of the respective finger controller 105. As should be understood, however, in embodiments, the touch-sensitive range 110 may be configured to have more or less than five actuation regions 170. Additionally, with contemplated embodiments of the present disclosure, each of the different finger controllers 105 may have a different number of actuation regions 170. For example, with a particular selected configuration of the beat player 100, the finger controller 105 for the kick drum (or the kick drum finger controller) may be configured to have only four actuation regions, whereas the snare drum finger controller may be configured to have six actuation regions, with the remaining finger controllers being configured to have, for example, a default number of activation regions (e.g., five actuation regions). Additionally, in embodiments, different percussive beat selections may be configured to have different numbers of actuation regions 170. For example, one particular selectable percussive beat may only have five actuation regions whereas a different selectable percussive beat may have seven actuation regions for each finger controller 105.

As shown in FIG. 1, the beat player 100 also includes a tempo selector 120 operable to select/alter a tempo for the beat player 100 and a corresponding tempo display 145 operable to display a currently selected tempo (e.g., in BPM or beats per minute). The tempo selector 120 may be, for example, a rotary encoder or potentiometer. The beat player 100 includes a percussive beat selector 125 operable to select/alter a percussive beat for the beat player 100 and a corresponding percussive beat display 150 operable to display a currently selected percussive beat (e.g., Straight 8th Beat, Four on the Floor, 16th Note Beat, Disco, Bossa Nova, Basic Swing, Train Beat, Motown, Half Time Shuffle, Samba, Reggae One Drop, Soca, Double Time Beat, Slow Blues, and Heavy Rock Beat). The beat player 100 may also include a drum kit selector 130 operable to select/alter a drum kit for the beat player 100 and a corresponding drum kit display 155 operable to display a currently selected drum kit (e.g., Jazz/Club Kit, Rock Kit, Studio Kit, Fusion Kit, Rock/Stage Kit, Hip-Hop/House Kit, Metal Kit, etc.).

As shown in FIG. 1, the beat player 100 may also include a sound selector 135 operable to select/alter a sound for a selected drum kit of the beat player 100 and a corresponding sound display 160 operable to display a currently selected sound. The beat player 100 also includes a hit pattern selector 140 operable to select/alter a hit pattern for the beat player 100 and a corresponding hit pattern display 165 operable to display a currently selected hit pattern (e.g., “kick pattern #1”).

The beat player 100 also includes a power and volume (mute) control section (including a power switch and, in embodiments, a mute switch). Additionally, while not shown, it should be understood that the beat player 100 has suitable jacks and connections, for example, on a rear side thereof. For example, the beat player 100 may include a headphone jack (e.g., ¼" or 3.5 mm), one or more expression pedal jacks, MIDI in, MIDI Thru, and MIDI out jacks, a power jack (e.g., USB power jack or AC power jack), CV connectors, a line out, and/or an audio out. While the beat player 100 may be connected to AC power with the power jack, the disclosure contemplates that the beat player 100 may be powered with a battery (e.g., DC power) or by USB. As such, the beat player 100 may have a suitable battery compartment for accommodating one or more batteries. Control Voltage (or CV) is a DC electrical signal used to manipulate the values of components in analog circuits. Control voltages are used in numerous ways in many different types of electronic circuits for all sorts of purposes and may be used to control electronic musical equipment.

To configure the beat player 100, a user utilizes the respective selectors to select a tempo, a percussive beat, and a drum kit, which selections, in embodiments, apply to the beat player 100 globally. In embodiments of the present disclosure, selection of a percussive beat (via the percussive beat selector 125 and indicated in the percussive beat display 150), may automatically assign hit patterns (e.g., “default” hit patterns) to each of the finger controllers 105.

The selected percussive beat is selectable, for example, using the percussive beat selector 125 (e.g., a rotary knob, rotary encoder, potentiometer) and is indicated on the corresponding percussive beat indicator 150. In embodiments of the disclosure, the selected percussive beat may set the tempo (e.g., “default” tempo) for the real-time performance. In other configurations, the beat player 100 may be configured to receive a tempo 145 from an external source (e.g., via MIDI), which ensures that the produced percussive beat of the beat player 100 is synchronized to the external source tempo (or timing).

As noted above, each percussive beat may be assigned a hit pattern (e.g., a default hit pattern) within the selected percussive beat. In embodiments, the user can vary the selected hit pattern assigned to each finger controller 105. For example, the user may use the hit pattern selector 140 to select a different hit pattern (which is displayed on the corresponding hit pattern display 165).

In embodiments, a user’s selection of the drum kit (via the drum kit selector 130 and indicated in the corresponding drum kit display 155), may automatically assign sounds (e.g., default sounds) to each finger controller 105 for the selected drum kit. In accordance with aspects of the disclosure, however, the user can vary the sound assigned to each finger controller (e.g., via the sound selector 135, which is indicated in the corresponding sound display 160).

In operation, a user actuates a hit pattern by placing their finger down anywhere along the range 110 of actuation regions 170 of a respective finger controller 105, and the beat player 100 produces (e.g., plays) a hit pattern based on the user selection. The user can vary the produced hit pattern by moving their finger up and down along the range 110 of the finger controller 105 along respective extension directions 175 to actuate different actuation regions 170 of the finger controller 105. For example, moving the user’s finger in one direction (e.g., away from the palm) may increase the complexity of the hit pattern 140, and moving in the other direction (e.g., towards the palm) may decrease the complexity of the produced hit pattern 140. In accordance with aspects of the disclosure, each variation in complexity of the hit pattern 140 remains true to the style of (and consistent as a whole with) a selected percussive beat 150.

In this fashion, in accordance with aspects of the disclosure, the user with no special aptitude, dexterity, or timing skills can create or participate with a percussion instrument in a real-time performance. For example, without need for any knowledge of music theory and/or knowledge of how to compose percussive beats, a user has great flexibility in varying the playback of a percussive performance in real-time. And, in accordance with aspects of the disclosure, a user can begin using the beat player 100 virtually immediately, without the need for any significant education, training, technology, or computer skills.

Additionally, embodiments of the beat player 100 may include additional palm controllers (e.g., left-side palm controller 115 and/or right-side palm controller 115'), which are operable to trigger, for example, a variety of variations of the selected percussive beat 150. In some embodiments, the beat player 100 may utilize at least one of the finger controllers 105 to trigger a variety of variations of the percussive beat 150, such as, for example: (1) fills to signal transitions; (2) random or quantized additional percussive or tonal sounds; (3) sound effects; and/or (4) audio processing effects (e.g., as applied to each track).

A further embodiment of the present disclosure may utilize the palm controllers 115 or may utilize at least one of the finger controllers 105 to vary the individual hits within a hit pattern 165 in terms of velocity, accent, attack, delay, sustain, and release, and other MIDI and MPE (MIDI Polyphonic Expression) parameters.

In contemplated embodiments, each pad (e.g., finger controller 105 and/or palm controllers 115) is MPE enabled. For example, in some embodiments, each finger controller 105 may comprise one or more MIDI polyphonic expression (MPE) controllers. The pad may be any surface comprising a touch point (e.g., a finger-actuatable continuous controller touch point), such as an optical diode for instance, or, as a second example, a continuous touch sensitive strip or mini-touch screen display, where a player sliding their finger around could select the enumerated variations. Additionally, the disclosure contemplates that a pad can be made of physical material which includes depressions (and/or protrusions).

A further embodiment of present disclosure may include playing with different parts of the body, such as the feet, or with motion or other types of sensors attached or detached from the body.

Figure 2:
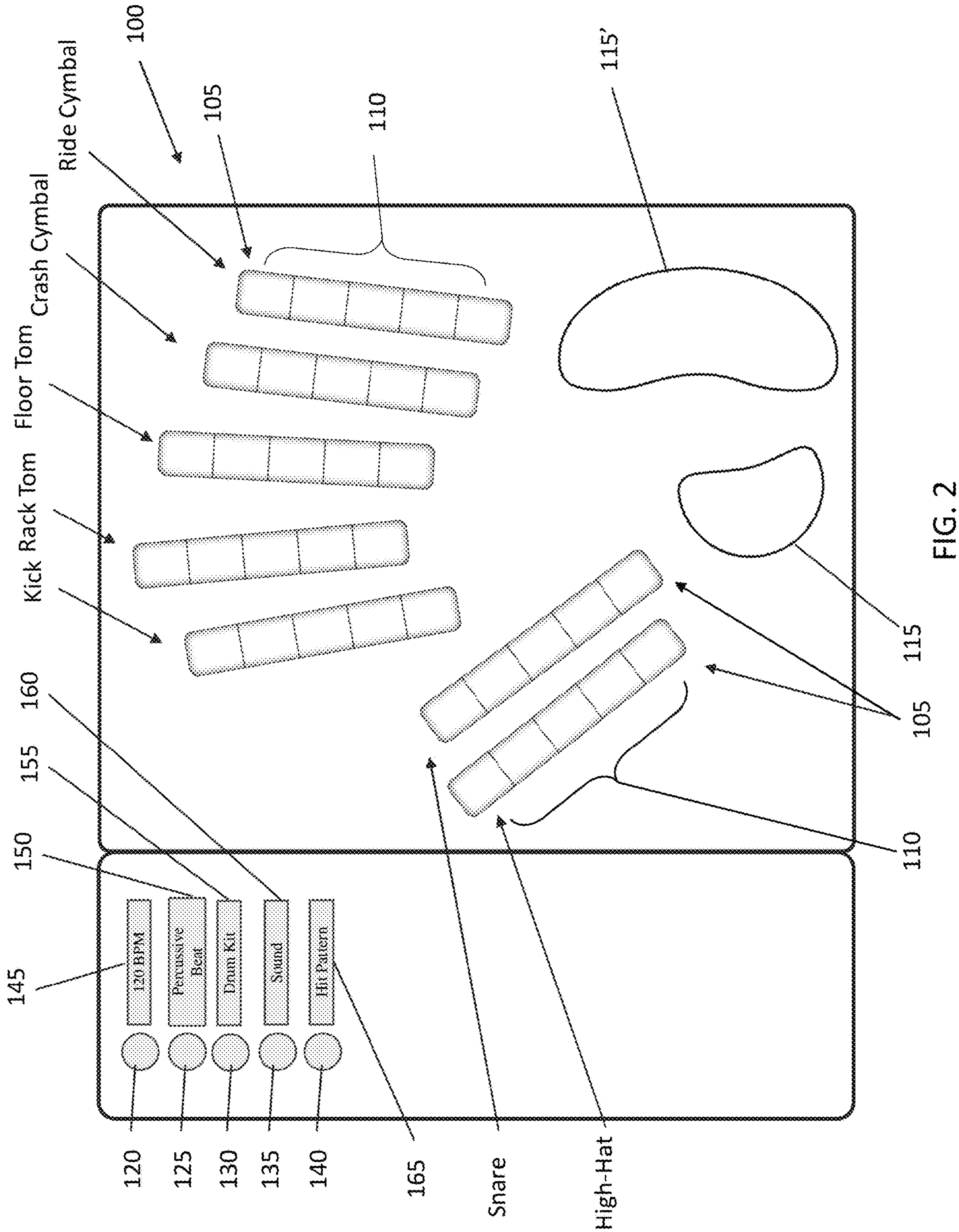
FIG. 2 shows an exemplary depiction of the beat player depicting that each finger controller corresponds a component part (e.g., kick drum; snare drum; tom drum(s); ride cymbal; crash cymbal: high-hat cymbals) of the percussive beat in accordance with aspects of the disclosure.

FIG. 2 shows an exemplary depiction of a beat player 105 depicting that each finger controller 105 corresponds a respective component part (e.g., kick drum; snare drum; tom drum(s); ride cymbal; crash cymbal: high-hat cymbals) of the percussive beat in accordance with aspects of the disclosure. As shown in FIG. 2, in accordance with aspects of the disclosure, each finger controller 105 is operable to control a respective component part. For example, with this exemplary embodiment and current configuration, one finger controller 105 is configured to control the high-hat (or select amongst the different high-hat patterns). Similarly, one finger controller 105 is configured to control the snare drum; one finger controller 105 is configured to control the kick drum; one finger controller 105 is configured to control the rack toms; one finger controller 105 is configured to control the floor tom; one finger controller 105 is configured to control the crash cymbal; and one finger controller 105 is configured to control the ride cymbals.

The disclosure also contemplates a user could play two beat players with each configured for their respective hands. For example, one beat player could be configured as shown in FIG. 2, e.g., as a "drum kit" player and the other beat player could be configured as a "percussion kit" player (see, e.g., FIG. 5B).

Figure 3:
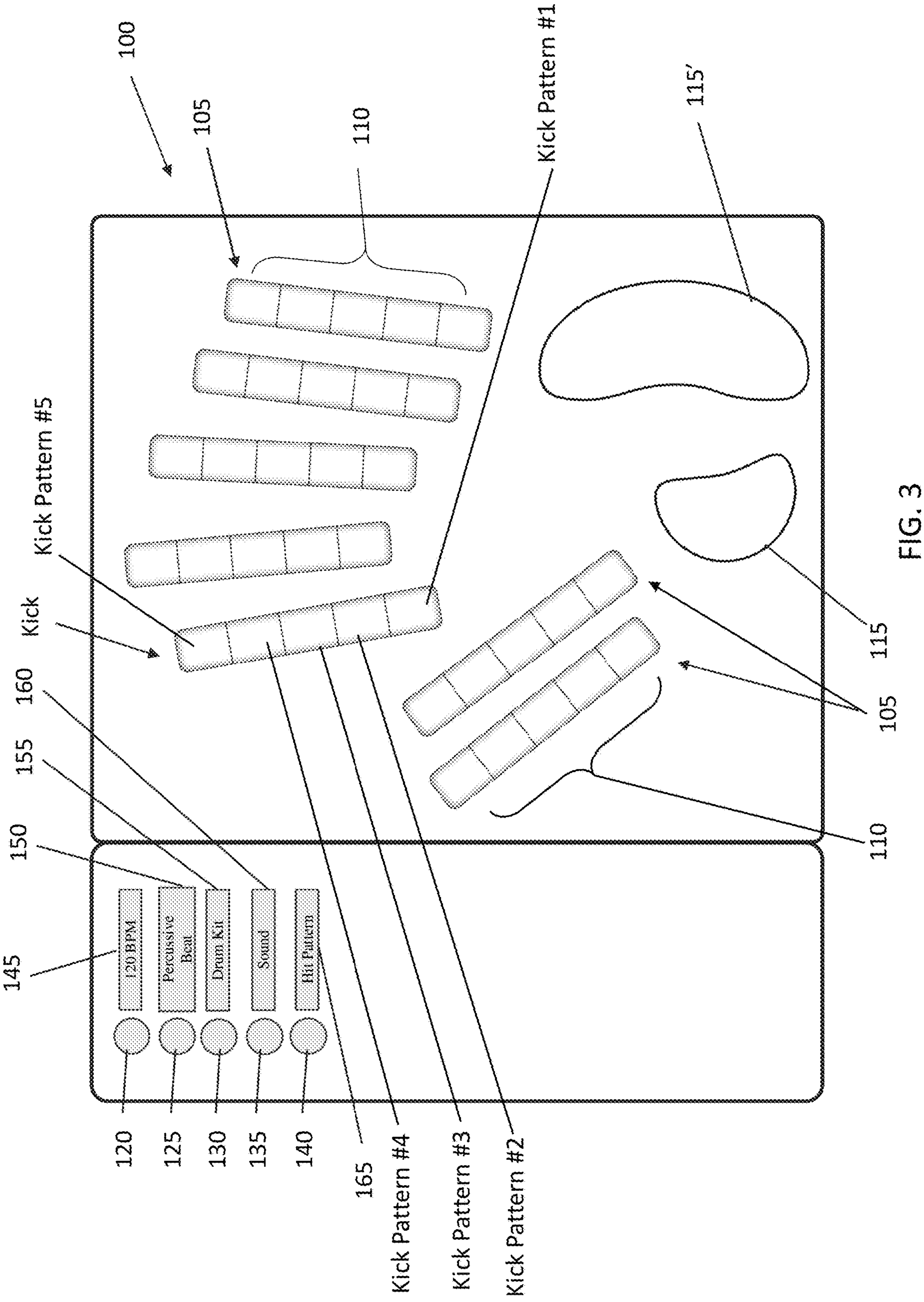
FIG. 3 shows an exemplary depiction of the beat player depicting the various kick patterns (which are specialized types of hit patterns) accessible along the range of the kick finger controller in accordance with aspects of the disclosure.

FIG. 3 shows an exemplary depiction of the beat player 100 depicting the various kick patterns (which are specialized types of hit patterns) accessible along the range of the kick finger controller in accordance with aspects of the disclosure. As shown in FIG. 3, with this exemplary embodiment, the range 110 of the finger controller 105 for the kick drum provides the user access to five different kick patterns (e.g., pre-recorded patterns using the record and play method). As such, by placing their finger (e.g., their index finger) in one of the selection regions 170 along the range 110 of the finger controller 105 for the kick drum, the user can "play" a selected kick drum pattern.

Additionally, in accordance with aspects of the disclosure, by moving their finger (e.g., the index finger) along the range 110 of the respective finger controller 105, the user can alter a selected kick pattern (which is a specialized type of hit pattern) to be played (in real-time). For example, a user may start with Kick Pattern #2 and then move their finger to Kick Pattern #4. Upon reaching the next measure (or sub-measure, for example), the beat player 100 changes the played kick drum pattern from Kick Pattern #2 to Kick Pattern #4. In embodiments, in accordance with aspects of the disclosure, the beat player 100 is configured to synchronize the change in selected pattern with the tempo of the song so that the selected changes are smooth. In such a manner, even though a user may not make the selection changes on the finger controller 105 in synchronization with a particular tempo, the beat player will play the changes to the selected beat pattern as if the selection changes were made in synchronization with (or at the appropriate time with) the particular tempo.

In accordance with aspects of the disclosure, a user can alter the selected kick pattern being produced by the beat player 100, while maintaining the selected beat patterns for the other component parts. While maintaining the selections made on one or more other finger controllers 105, the user can just vary the kick pattern by altering his selection on the finger controller 105 for the kick drum. Additionally, for example, a user may utilize his other fingers and thumb to select beat patterns for one or more other component parts. In such a manner, a user may select and vary selection of each of the component parts currently played by the beat player 100 in real-time.

In some contemplated embodiments, the currently selectable kick patterns may vary from each other in complexity (e.g., with Kick Pattern #1 being the relatively least complex kick drum pattern and Kick Pattern #5 being the relatively most complex kick drum pattern). In other contemplated embodiments, the currently selectable kick patterns may vary from each other in intensity or loudness (e.g., with Kick Pattern #1 being the relatively least intense or quietest kick drum pattern and Kick Pattern #5 being the relatively most intense or loudest kick drum pattern). Similarly, the other component parts have different beat patterns of varying complexity, of varying intensity, and/or of varying loudness accessible along the ranges 110 of the respective finger controllers 105.

Figure 4:
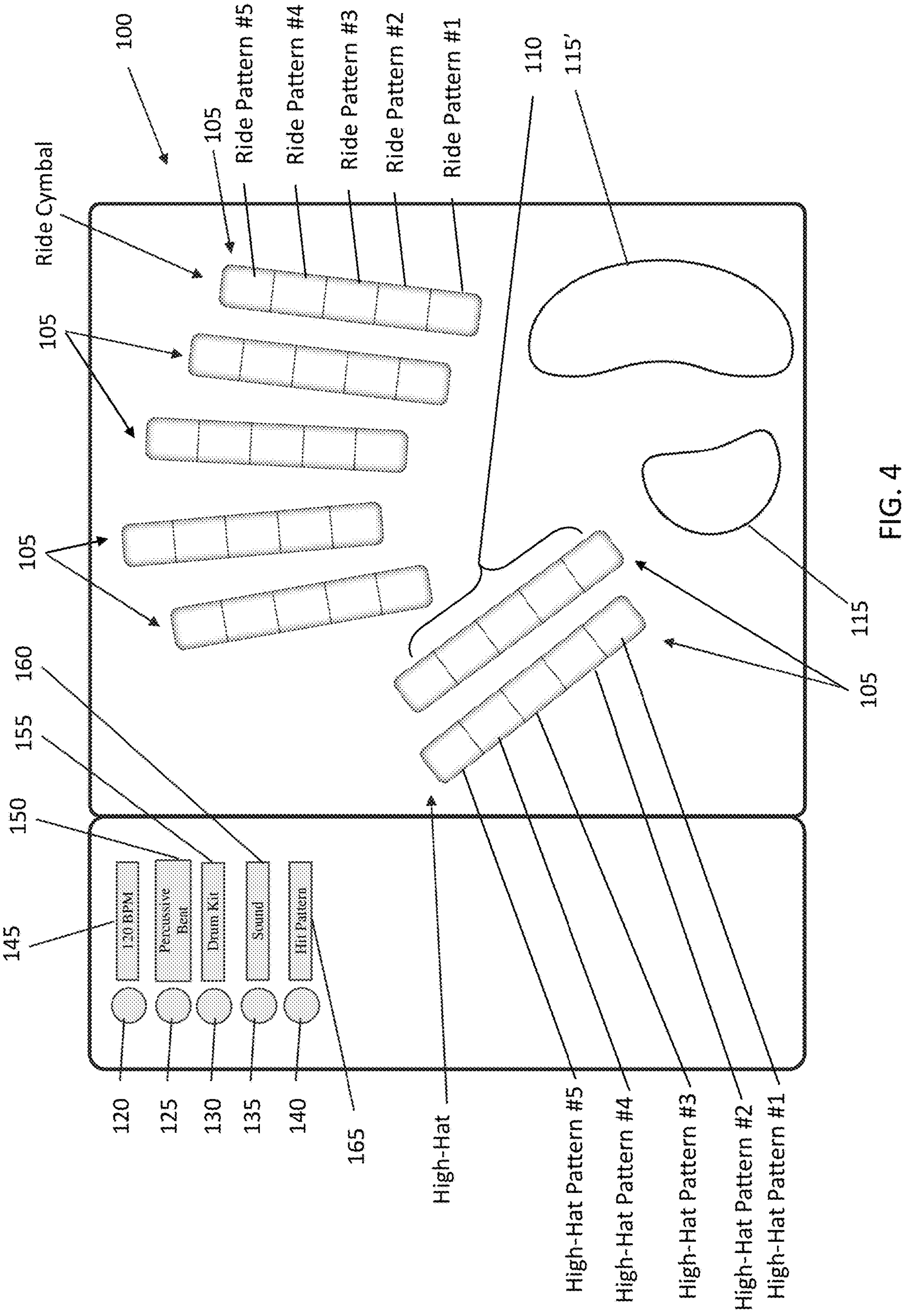
FIG. 4 shows an exemplary depiction of the beat player depicting the various high-hat patterns (which are specialized types of hit patterns) accessible along the range of the high-hat finger controller and the various ride cymbal patterns (or "ride patterns") (which are specialized types of hit patterns) accessible along the range of the ride cymbal finger controller in accordance with aspects of the disclosure.

FIG. 4 shows an exemplary depiction of the beat player depicting the various high-hat patterns (which are specialized types of hit patterns) accessible along the range of the high-hat finger controller and the various ride cymbal patterns (or "ride patterns") (which are specialized types of hit patterns) accessible along the range of the ride cymbal finger controller in accordance with aspects of the disclosure. As shown in FIG. 4, the range 110 of the finger controller 105 for the high-hat provides the user access to five different high-hat patterns. As such, by placing their finger (e.g., their thumb) in one of the selection regions 170 along the range 110 of the finger controller 105 for the high-hat, the user can "play" a selected high-hat pattern (that is, a previously recorded audio or MIDI high-hat pattern).

Additionally, by moving their finger (e.g., their thumb) along the range 110 of the finger control 105, the user can vary the selected high-hat pattern the beat player 100 plays. For example, a user may start with High-Hat Pattern #1 and then move their finger to High-Hat Pattern #5.

Additionally, as shown in FIG. 4, the range 110 of the finger controller 105 for the ride cymbal provides the user access to five different ride cymbal patterns (which are specialized types of hit patterns). As such, by placing their finger (e.g., their pinky finger) in one of the selection regions 170 along the range 110 of the finger controller 105 for the ride cymbal, the user can play a selected ride cymbal pattern. Additionally, by moving their finger (e.g., the pinky) along the range 110 of the finger controller 105 for the ride cymbal, the user can vary the selected ride cymbal pattern. For example, a user may start with Ride cymbal Pattern #5 and then move their finger to Ride Pattern #2.

In such a manner, in accordance with aspects of the disclosure, a user can simultaneously make individual component selection changes for each respective component of a drum set in real-time. As such, by implementing aspects of the disclosure, a user may create and vary percussive music in real-time and in sync with a given tempo.

Figure 5A:
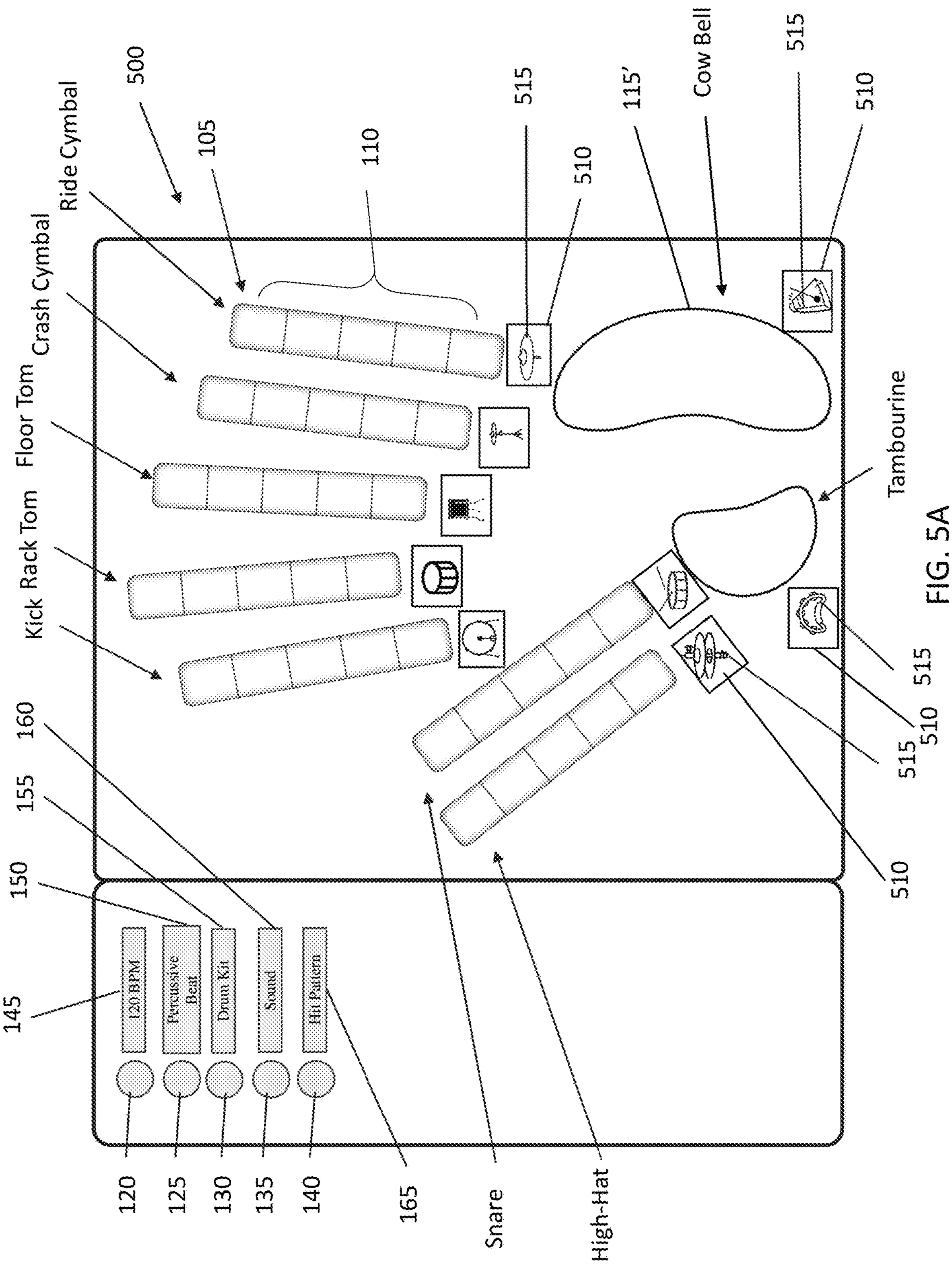
FIG. 5A shows an exemplary depiction of a beat player depicting a component part indicator for each finger controller in accordance with aspects of the disclosure.

FIG. 5A shows an exemplary depiction of a beat player 500 depicting a component part indicator 510 for each finger controller 105 in accordance with aspects of the disclosure. As shown in FIG. 5A, with this exemplary embodiment, the component part indicator 510 (e.g., LCD screen) is operable to display a component part indicator (e.g., a symbol 515 or text indicator). In such a manner, a user can identify the respective component part assigned to each finger controller 105. Thus, as shown in FIG. 5A, the finger controller 105 for the high-hat, for example, displays a high-hat symbol on its respective component part indicator 510. Likewise, the finger controller 105 for the floor tom, for example, displays a floor tom symbol on its respective component part indicator 510. In such a manner, a user can more easily identify what component part each finger controller is configured to control. As such, if a user configures the component parts to be in different relative locations, a user can easily identify what component part each finger controller is configured to control. In other contemplated embodiments, the beat player may include respective static text (or symbolic) labels for each of the finger controllers, for example, with contemplated embodiments of the beat player in which the association between the finger controllers and their respective component parts are not rearrangeable.

As shown in FIG. 5A, the optional controllers (or control pads) 115, 115' may also be configured to actuate a percussion sound. For example, with the exemplary embodiment, the left-handed control pad 115 may be configured to play a tambourine and the right-handed control pad 115' may be configured to play a cowbell. In contrast to the multiple selection regions of the finger controller 105, in some embodiments, the control pads 115, 115' may have a single selection region. By contacting the respective control pads (e.g., left-side heel/palm contact 115 or right-side heel/palm contact 115'), a user may activate a tambourine sound or a cowbell sound (in time with the selected tempo). In other contemplated embodiments, the control pads 115, 115' may have multiple selection regions (similar to the finger controllers 105).

In accordance with additional aspects of the disclosure, a user may configure the beat player 100 so that different fingers control components different than (or in a relative order to) the configuration shown in FIG. 5A. That is, with embodiments of the beat player, the association between the finger controllers and their respective component parts are rearrangeable. In such a manner, a user may configure the beat player to a desired personal configuration layout. Additionally, as noted above, if a user configures the component parts to be in different relative locations, a user can easily identify what component part each finger controller is configured to control using the component part indicators 510.

Figure 5B:
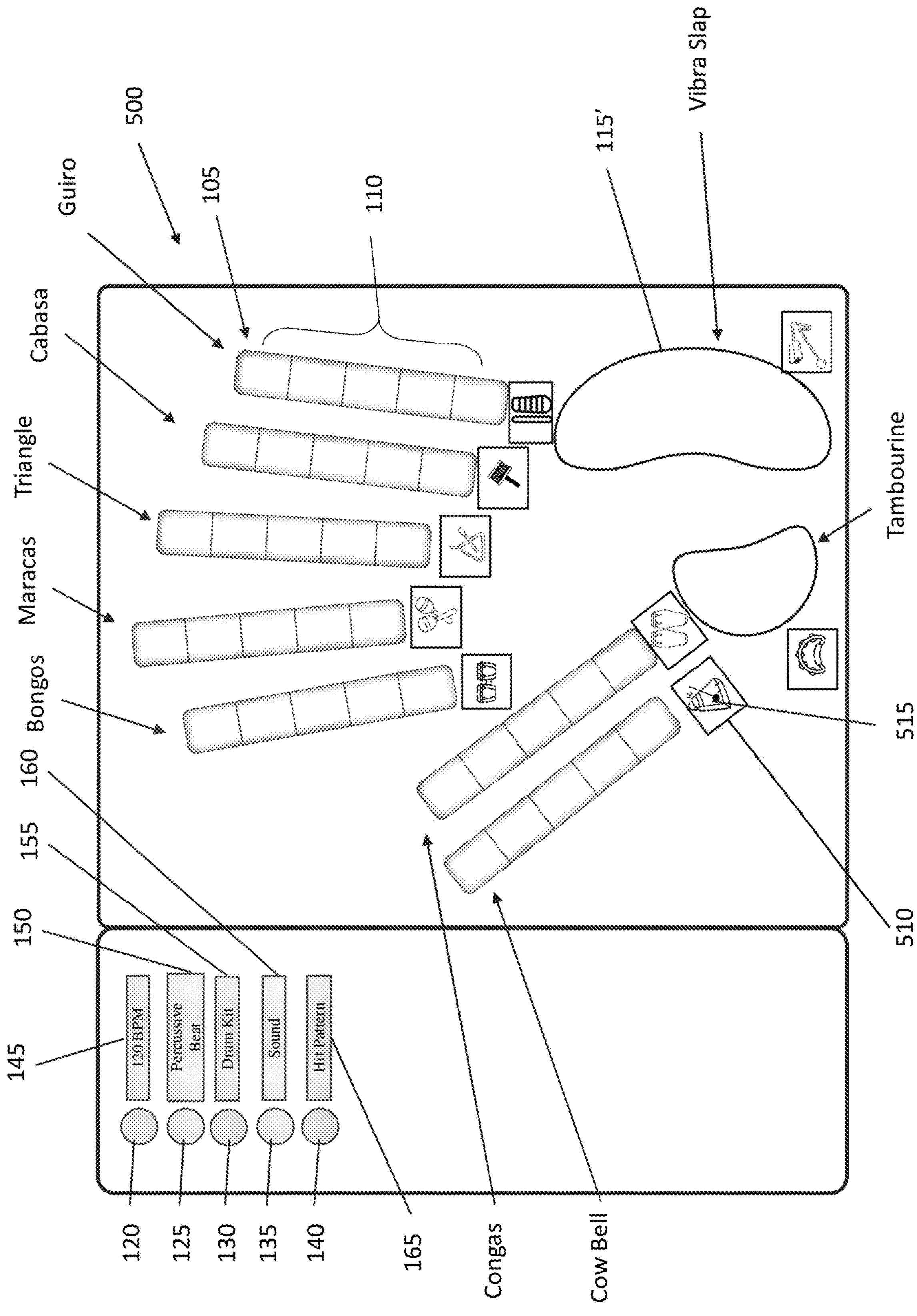
FIG. 5B shows an exemplary depiction of a beat player depicting a component part indicator for each finger controller with an alternative instrumentation configuration than that of FIG. 5A in accordance with aspects of the disclosure.

FIG. 5B shows an exemplary depiction of the beat player 500 depicting a component part indicator for each finger controller with an alternative instrumentation configuration in accordance with aspects of the disclosure. In contrast to the "drum kit" configuration of FIGS. 1-5A, with the exemplary embodiment of FIG. 5B, the beat player has an alternative instrumentation configuration. The exemplary alternative instrumentation configuration of FIG. 5B shows the beat player 500 with a "percussion kit" configuration. Thus, in contrast to the "drum kit" component parts of FIG. 5A, which include: high-hat, snare, kick, rack toms, floor tom, crash cymbal, ride cymbal, tambourine, and cow bell, with the exemplary and non-limiting "percussion kit" configuration of FIG. 5B, the component parts include: cow bell, congas, bongos, maracas, triangle, cabasa, guiro, vibra slap, and tambourine. As shown in FIG. 5B, each finger controller 105 corresponds a component part, and provides access to tracks representing that component part.

Figure 6A:
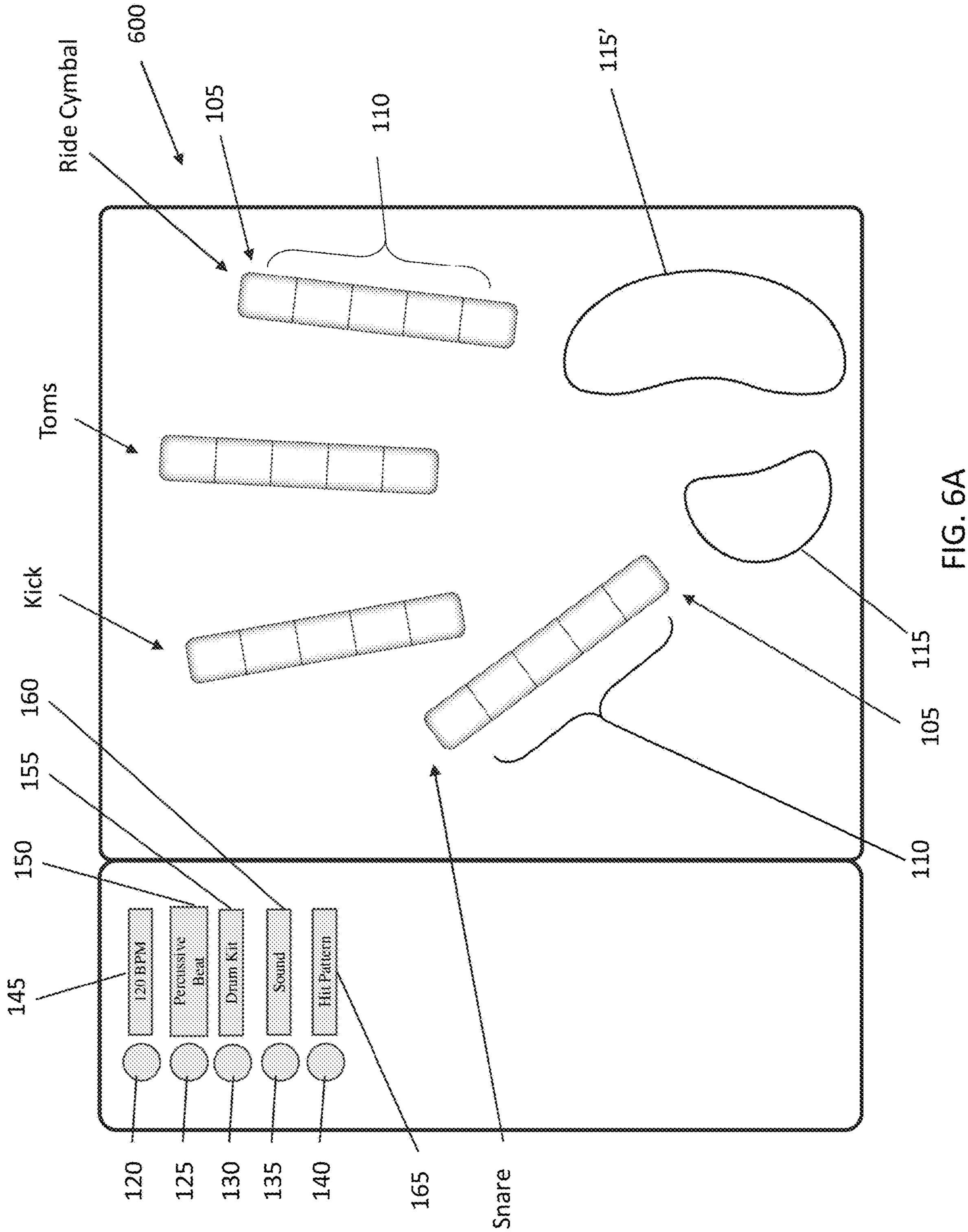
FIG. 6A shows an exemplary depiction of the beat player with fewer finger controllers in accordance with aspects of the disclosure.

FIG. 6A shows an exemplary depiction of a beat player 600 configured with fewer finger controllers 105 in accordance with aspects of the disclosure. That is, a user may configure the beat player 600 to have, for example, only four finger controller 105, with one for each of: (1) a snare drum; (2) a kick drum; (3) tom drums; and (4) a ride cymbal. In such a manner, the beat player is operable to be configured as a reduced or minimal drum kit. By configuring the beat player 600 with fewer finger controllers 105, a user may be able to even more easily play the beat player, thus making the musical instrument even more approachable. Of course, it should be understood that other contemplated embodiments of the present disclosure could include more than seven finger controllers 105.

Figure 6B:
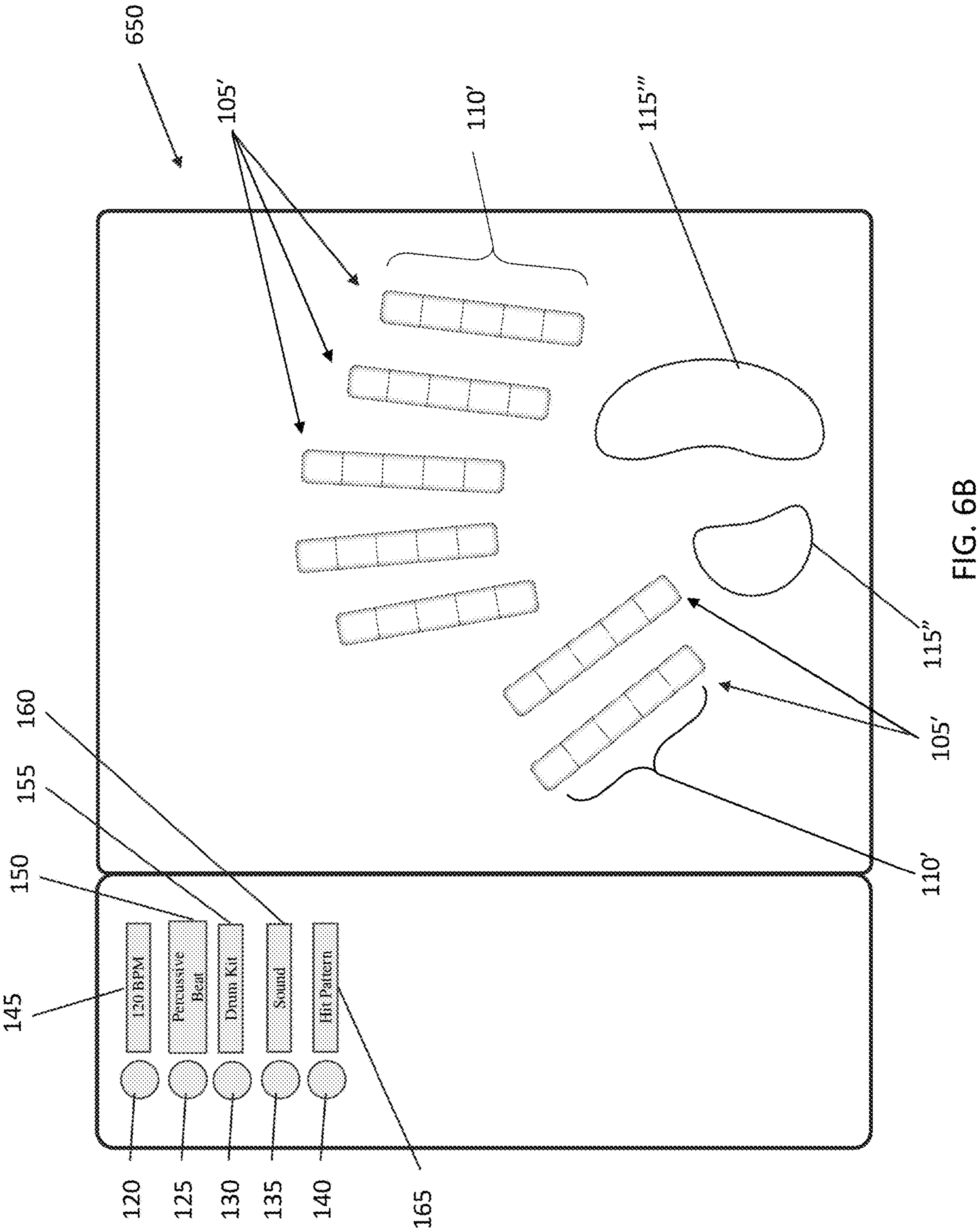
FIG. 6B shows an exemplary depiction of the beat player with smaller finger controllers in accordance with aspects of the disclosure.

FIG. 6B shows an exemplary depiction of a beat player 650 configured with smaller finger controllers 105' in accordance with aspects of the disclosure. That is, a user may configure the beat player 650 to have finger controller 105 that are smaller in size. In such a manner, the beat player is operable to be configured for players with smaller hands. By configuring the beat player 650 with smaller finger controllers 105' (and smaller palm controllers 115" and 115' "), a user with smaller hands may be able to even more easily play the beat player, thus making the musical instrument even more approachable. Of course, it should be understood that other contemplated embodiments of the present disclosure could include larger finger controllers 105. In yet other contemplated embodiments, the beat player may be operable to provide a custom-sized array of finger controllers (e.g., using a touch-screen to measure a users' hand size).

Figure 6C:
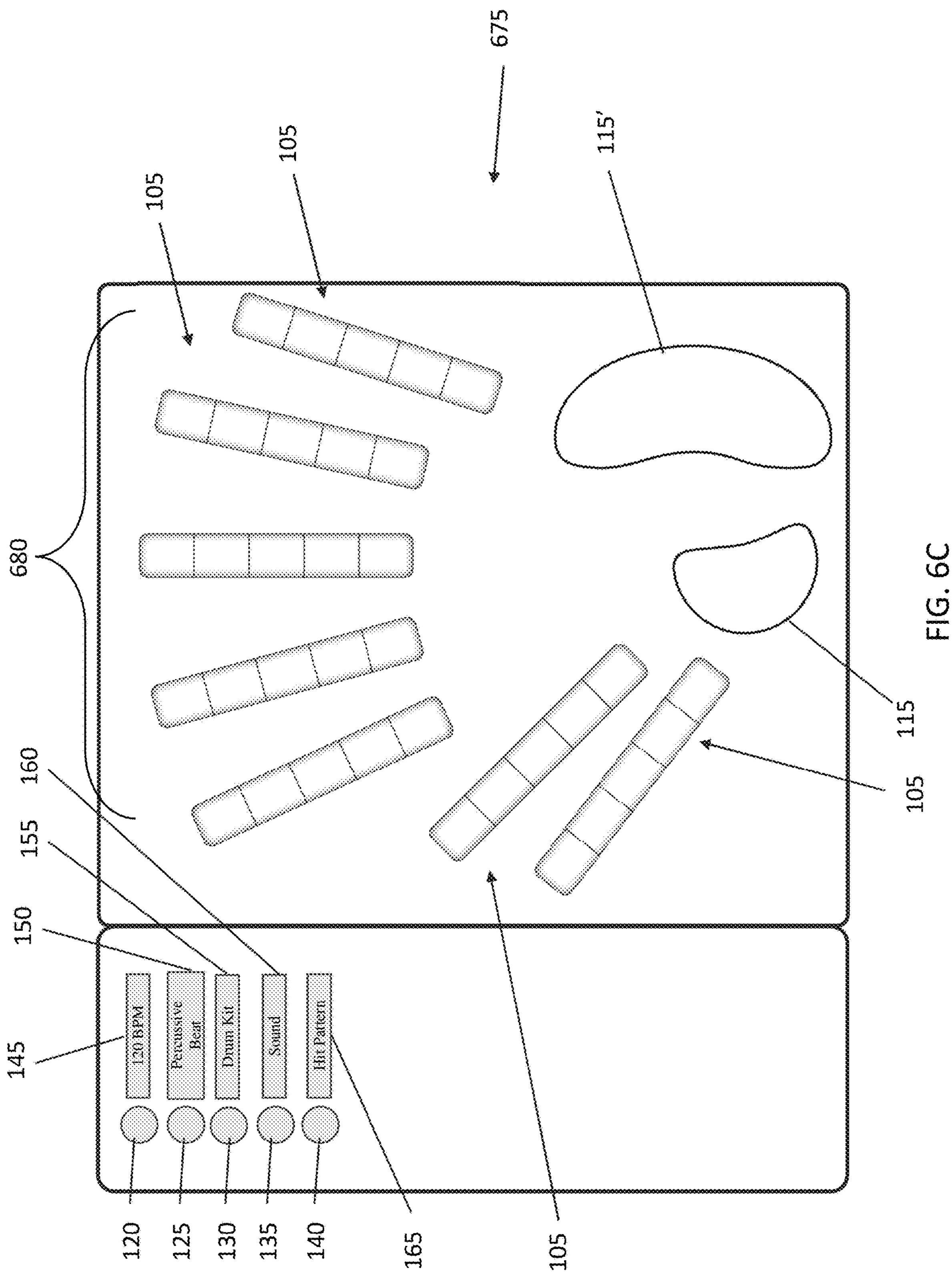
FIG. 6C shows an exemplary depiction of the beat player with a wider array of finger controllers in accordance with aspects of the disclosure.

FIG. 6C shows an exemplary depiction of the beat player 675 with a wider array 680 of finger controllers 105 in accordance with aspects of the disclosure. That is, a user may configure the beat player 675 to have finger controller 105 that in a wider array and spaced further from one another. In such a manner, the beat player is operable to be configured for players with a wider span. By configuring the beat player 675 with spacing between finger controllers, a user with larger hands may be able to even more easily play the beat player, thus making the musical instrument even more approachable. Of course, it should be understood that other contemplated embodiments of the present disclosure could include finger controllers 105 in a narrower array. In yet other contemplated embodiments, the beat player may be operable to provide a custom-sized array of finger controllers (e.g., using a touch-screen to measure a users' hand size and desired array or span).

FIG. 7 depicts an exemplary percussive beat library 700 and an exemplary drum kit library 750 in accordance with aspects of the disclosure. As shown in FIG. 7, the exemplary percussive beat library 700 includes a number (n) of percussive beats (e.g., Straight 8th Beat, Four on the Floor, 16th Note Beat, Disco, Bossa Nova, Basic Swing, Train Beat, Motown, Half Time Shuffle, Samba, Reggae One Drop, Soca, Double Time Beat, Slow Blues, and Heavy Rock Beat). Each percussive beat includes the respective selectable hit patterns for each of the component parts. Additionally, each percussive beat may include a default tempo. Additionally, as shown in FIG. 7, the exemplary drum kit library 700 includes a number (m) of drum kits (e.g., Jazz/Club Kit, Rock Kit, Studio Kit, Fusion Kit, Rock/Stage Kit, Hip-Hop/House Kit, Metal Kit, etc.). Each drum kit includes the sounds for each of the component parts. Additionally, each drum kit may include selectable alternative sounds.

As described above, a user may select a percussive beat from the percussive beat library, which may automatically assign hit patterns to each of the finger controllers. The selected percussive beat is selectable, for example, using the percussive beat selector (e.g., a rotary knob, rotary encoder, potentiometer) and is indicated on a corresponding indicator, that is the percussive beat indicator. In embodiments of the disclosure, each selectable percussive beat may have an associated initial tempo In embodiments, the user can vary the selected hit pattern assigned to each finger controller.

Additionally, as described above, a user's selection of the drum kit (via the drum kit selector), may automatically assign sounds (e.g., default sounds) to each finger controller for the selected drum kit. In accordance with aspects of the disclosure, the user, however, can vary the sound assigned to each finger controller.

Figure 8:
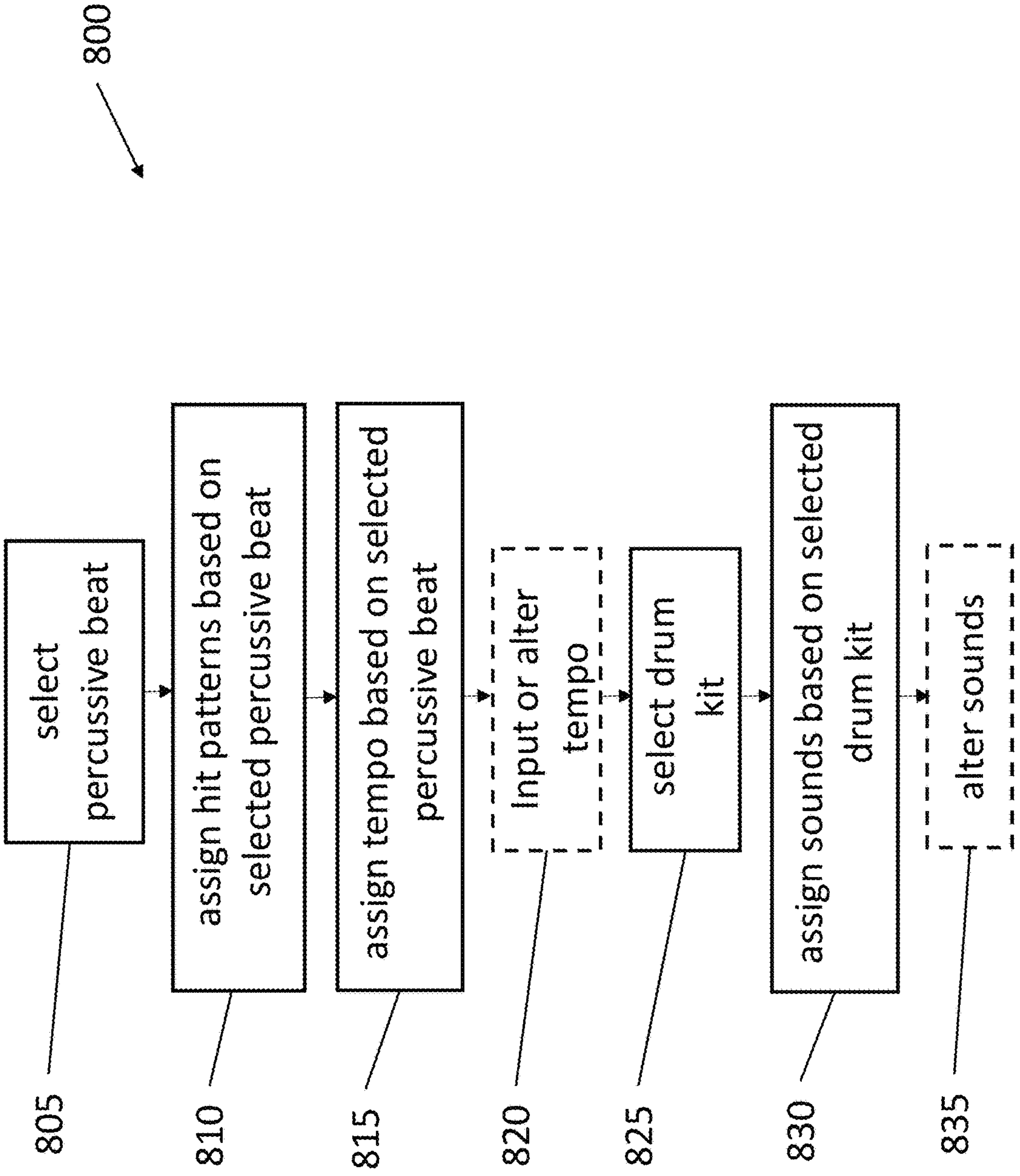
FIG. 8 shows an exemplary flow for configuring a beat player in accordance with aspects of the disclosure.

FIG. 8 shows an exemplary flow 800 for configuring a beat player in accordance with aspects of the disclosure. As shown in FIG. 8, at step 805 a user selects a percussive beat using the percussive beat selector. At step 810, the beat player assigns hit patterns (e.g., five hit patterns) for each of the components having finger controllers (e.g., seven components) and the palm/heel controllers based on selected percussive beat. At step 815, the beat player assigns a tempo based on selected percussive beat. At optional step 820, the user inputs (e.g., via rotary controller or MIDI input) a tempo or alters a tempo. As step 825, the user selects a drum kit (e.g., rock kit, jazz kit, percussion kit, etc.) using the drum kit selector. At step 830, the beat player assigns sounds (e.g., default sounds) based on the selected drum kit. At optional step 835, the user may alter the default sounds to different sounds (e.g., selectable alternative sounds) using the sounds selector. It should be understood that, while the steps of the exemplary flow 800 are shown in a particular order, some of these steps may be optional or performed in a different order (or simultaneously).

Figure 9:
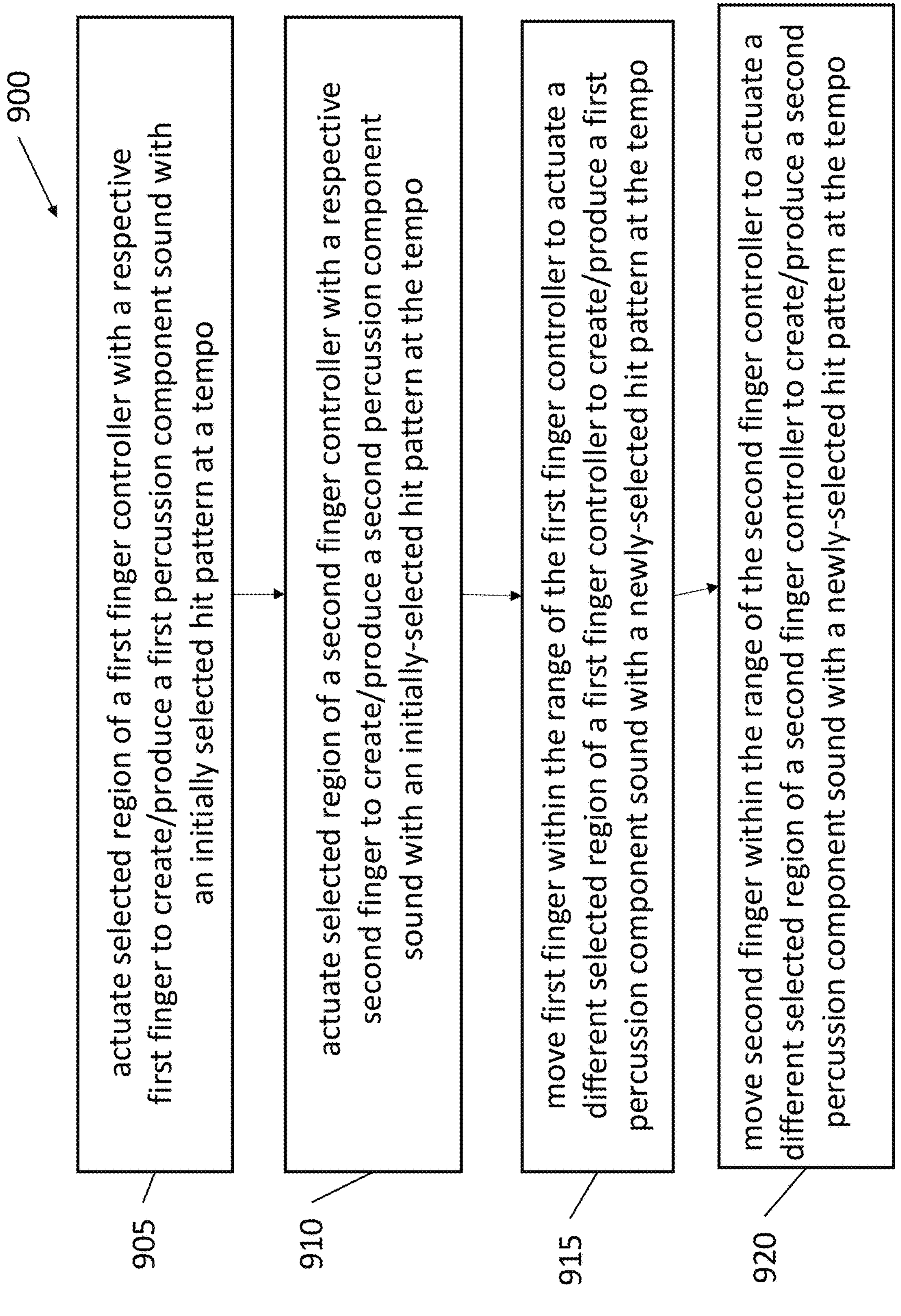
FIG. 9 shows an exemplary flow for playing a beat player in accordance with aspects of the disclosure.

FIG. 9 shows an exemplary flow for playing a beat player in accordance with aspects of the disclosure. As shown in FIG. 9, at step 905 a user may actuate a selected region of a first finger controller with a respective first finger to create/produce a first percussion component sound with an initially selected hit pattern at a tempo. At step 910, a user may actuate a selected region of a second finger controller with a respective second finger to create/produce a second percussion component sound with an initially-selected hit pattern at the tempo. At step 915, a user may move first finger within the range of the first finger controller to actuate a different selected region of a first finger controller to create/produce a first percussion component sound with a newly-selected hit pattern at the tempo. At step 920, a user may move second finger within the range of the second finger controller to actuate a different selected region of a second finger controller to create/produce a second percussion component sound with a newly-selected hit pattern at the tempo. It should be understood that, while the steps of the exemplary flow 900 are shown in a particular order, one or more of these steps may be optional or performed in a different order (or simultaneously).

System Environment

Aspects of embodiments of the present disclosure (e.g., a beat player) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc. In contemplated embodiments, the control systems may be embedded in the beat player to make it stand alone. In contemplated embodiments, the beat player and control system may be virtually implemented on a touch screen.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, touch screen, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, touch screen, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, Bluetooth, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, entirely embedded within the beat player, or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 10:
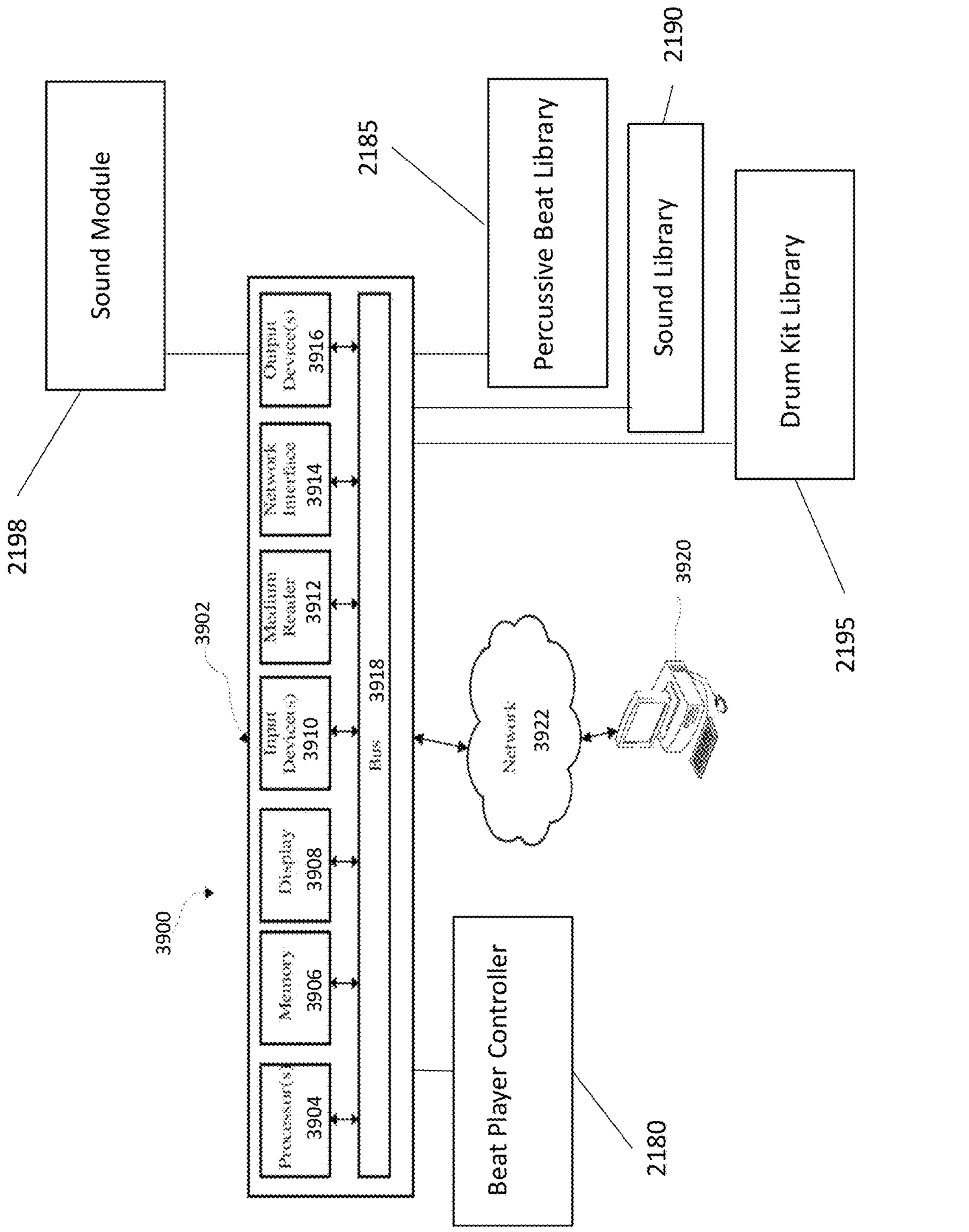
FIG. 10 shows an exemplary environment for practicing aspects of the present disclosure.

FIG. 10 is an exemplary system 3900 for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks, cloud environment or embedded within the chord board.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

FIG. 10 shows an exemplary environment for practicing aspects of the present disclosure. As illustrated in FIG. 10, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 10, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 10, the system 3900 may include a beat player controller 2180 operable to control a beat player board (e.g., using a touch screen of a tablet) in accordance with the present disclosure, a percussive beat library 2185, a sound library 2190, a drum kit library 2195, and a sound module 2198.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 10. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols (e.g., MIDI, pads), the disclosure is not limited to such standards and protocols. Such standards are periodically superseded by faster or more efficient equivalents having essentially the same functions. Accordingly, replacement standards and protocols having the same or similar functions are considered equivalents thereof.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A musical instrument operable to play a multi-component percussive beat comprising a plurality of component parts, each component part being a single percussion instrument of the multi-component percussive beat, the musical instrument comprising:

a plurality of finger controllers, wherein each finger controller is operable to control one of the component parts of the multi-component percussive beat corresponding to a respective single percussion instrument of the multi-component percussive beat, each of the plurality of finger controllers having a touch-sensitive range providing a plurality of actuation regions there along that are actuatable by placing a finger down anywhere along the range to playback a selected hit pattern based on user selection, wherein each actuation region corresponds to a different hit pattern from amongst selectable hit patterns for the respective single percussion instrument, and each actuation region, while actuated, is operable to play a repeating hit pattern of one or more hits from amongst the selectable hit patterns on the respective single percussion instrument that repeats for each measure of the multi-component percussive beat, and which is associated with a component percussion track representing the respective single percussion instrument of the multi-component percussive beat.

2. The musical instrument of claim 1, wherein the component parts include at least two of: a kick drum; a snare drum; a tom drum; a ride cymbal; a crash cymbal; and a high-hat.

3. The musical instrument of claim 1, wherein the plurality of finger controllers are arrayed in a hand-shaped layout.

4. The musical instrument of claim 1, wherein the plurality of actuation regions on each of the plurality of finger controllers is a same number of actuation regions for each of the plurality of finger controllers.

5. The musical instrument of claim 1, wherein the plurality of actuation regions on each of the plurality of finger controllers is a different number of actuation regions for at least one of the plurality of finger controllers.

6. The musical instrument of claim 1, wherein the plurality of actuation regions on each of the plurality of finger controllers is five actuation regions.

7. The musical instrument of claim 1, wherein each of the finger controllers comprises a MIDI polyphonic expression (MPE) controller.

8. The musical instrument of claim 1, further comprising a tempo selector operable to select a tempo of the multi-component percussive rhythm.

9. The musical instrument of claim 8, further comprising a tempo display operable to display the selected tempo of the multi-component percussive rhythm.

10. The musical instrument of claim 1, further comprising a percussive beat selector operable to select a percussive beat of the multi-component percussive rhythm.

11. The musical instrument of claim 10, further comprising a percussive beat display operable to display the selected percussive beat of the multi-component percussive rhythm.

12. The musical instrument of claim 1, further comprising a drum kit selector operable to select a drum kit for the multi-component percussive rhythm.

13. The musical instrument of claim 12, further comprising a drum kit display operable to display the selected drum kit for the multi-component percussive rhythm.

14. The musical instrument of claim 12, further comprising a sound selector operable to select a sound of the selected drum kit.

15. The musical instrument of claim 14, further comprising a sound display operable to display the selected sound of the selected drum kit.

16. The musical instrument of claim 1, further comprising a hit pattern selector operable to select a hit pattern of the multi-component percussive beat.

17. The musical instrument of claim 16, further comprising a hit pattern display operable to display the selected hit pattern of the multi-component percussive beat.

18. The musical instrument of claim 1, wherein a first finger controller is configured to control a high-hat component part of the multi-component percussive beat; a second finger controller is configured to control the snare drum component part of the multi-component beat; a third finger controller is configured to control the kick drum component part of the multi-component beat; a fourth finger controller is configured to control the rack toms component part of the multi-component percussive beat; a fifth finger controller is configured to control the floor tom component part of the multi-component percussive beat; a sixth finger controller is configured to control the crash cymbal component part of the multi-component percussive beat; and a seventh finger controller is configured to control the ride cymbal component part of the multi-component percussive beat.

19. The musical instrument of claim 1, wherein with a single hand, a user can selectively activate each component part of the multi-component percussive beat.

20. The musical instrument of claim 1, wherein one or more varied hit patterns are user actuatable by moving their finger along the range of the finger controller to actuate one or more different actuation regions of the finger controller, and the musical instrument is operable to playback the one or more varied hit patterns based on the user selection.

21. The musical instrument of claim 20, wherein the one or more varied hit patterns vary in rhythm complexity.

22. The musical instrument of claim 20, wherein the one or more varied hit patterns vary in intensity.

23. The musical instrument of claim 1, further comprising one or more palm controllers operable to trigger a variety of variations of the multi-component percussive rhythm.

24. The musical instrument of claim 1, wherein at least one of the plurality of finger controllers is operable to trigger at least one of: percussion fills; random or quantized additional percussive or tonal sounds; sound effects; and/or audio processing effects.

25. The musical instrument of claim 1, wherein each finger controller provides the user access to five different selectable hit patterns.

26. The musical instrument of claim 1, further comprising a component part indicator for each finger controller.

27. The musical instrument of claim 26, wherein the component part indicator is operable to display a component part indication indicating the respective component part assigned to each finger controller.

28. The musical instrument of claim 1, wherein a correspondence between each of the finger controllers and each of the component parts is user-configurable.

29. The musical instrument of claim 1, wherein while two actuation regions are actuated on two respective finger controllers, is operable to play two repeating hit patterns, with each of the two repeating hit patterns representing a different single percussion instrument of the multi-component percussive beat.

* * * * *